Figure 1:
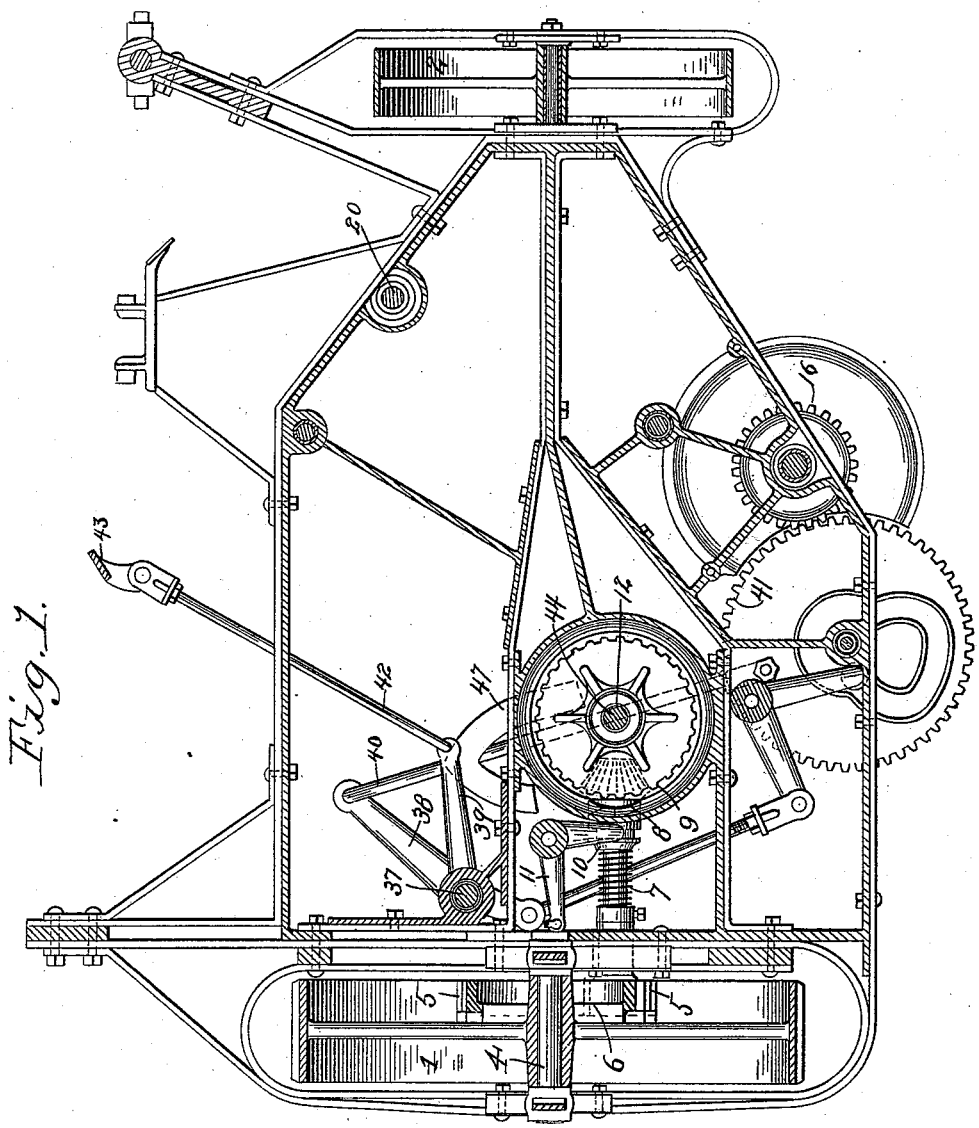

(No Model.)  6 Sheets—Sheet 1.

G. W. PACKER.
CORN HARVESTER.

No. 525,360.  Patented Sept. 4, 1894.

WITNESSES:

INVENTOR
George W. Packer
BY John G. Manahan
his ATTORNEY.

(No Model.)  G. W. PACKER.  6 Sheets—Sheet 2.
CORN HARVESTER.

No. 525,360.  Patented Sept. 4, 1894.

WITNESSES:  INVENTOR
George W. Packer
BY
John G. Manahan
his ATTORNEY.

(No Model.)

G. W. PACKER.
CORN HARVESTER.

No. 525,360.

6 Sheets—Sheet 3.

Patented Sept. 4, 1894.

Witnesses
C. C. Bindrue
C. B. Bull.

Inventor
George W. Packer
by John G. Manahan
his Attorney

THE NORRIS PETERS CO., PHOTO-LITHO., WASHINGTON, D. C.

(No Model.)

G. W. PACKER.
CORN HARVESTER.

No. 525,360.

6 Sheets—Sheet 4.

Patented Sept. 4, 1894.

WITNESSES:
Ole Burdine
C. B. Bull

INVENTOR
George W. Packer
BY
John G. Manahan
his ATTORNEY.

(No Model.)  
G. W. PACKER.  
CORN HARVESTER.  
6 Sheets—Sheet 5.

No. 525,360.  
Patented Sept. 4, 1894.

WITNESSES:  
INVENTOR  
George W. Packer  
BY John G. Manahan  
his ATTORNEY.

(No Model.)                G. W. PACKER.                6 Sheets—Sheet 6.
                            CORN HARVESTER.
No. 525,360.                              Patented Sept. 4, 1894.

WITNESSES:                                INVENTOR
                                          George W. Packer
                                        BY
                                          John G. Manahan
                                              his ATTORNEY.

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

CORN-HARVESTER.

SPECIFICATION forming part of Letters Patent No. 525,360, dated September 4, 1894.

Application filed November 29, 1893. Serial No. 492,359. (No model.)

*To all whom it may concern:*

Be it known that I, GEORGE W. PACKER, a citizen of the United States, residing at Rock Falls, in the county of Whiteside and State of Illinois, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to improvements in corn harvesters and consists in certain mechanism, hereinafter more specifically described, by which the standing corn is gathered on to the machine, and held in the grasp of certain devices before, and at the time of its severance, and from the point of severance conveyed, in a vertical position, to the binding apparatus, and by the latter bound into bundles of suitable size, which are discharged at the left side and rear of the machine.

The first part of my invention consists of peculiar mechanism for cutting or severing the corn stalks from the earth. Heretofore attempts have been made to force the cutting knife, or knives, through the stalk laterally by various means, in all of which the stalk, at the initiate of the cut, bent over and bound upon the knife, making it impracticable to force the knife entirely through the stalk, and the machine meanwhile passing over the ground, and the stalk, being pinched upon the knife, was, in many instances, drawn out of the ground, making it inconvenient to handle, with the dangling roots and adhering earth. In those instances where the stalk gave way, by breaking at the point of impact of the knife, the force required to break it was such as to give a jar and irregular action to the machine, as well as to impose great labor upon the team. The hills of corn being generally located several feet apart, and the cutting mechanism running empty between the hills, it will be seen that this severe strain upon the machine, at the recurring periods of contact with the several hills, gave the machine a peculiar and very arduous task to perform. I overcome the above difficulty by the use of a rotating stalk bender, having a periphery either circular or notched, in connection with a diagonally placed stalk cutting knife. The bender rotates in a substantially horizontal position below the edge of the knife, passing under the latter as closely as practicable, and preferably consists of a wheel having a periphery formed into a series of cams with a dull, thick edge, having intervening recesses, said cams passing successively under the cutting knife with a shear action, and adapted to bend the stalk toward the knife, so that the entrance of the knife is upon the convex side of the stalk, which continues to open as the knife enters the same, thereby effectually preventing the stalk from pinching upon the knife blade, the cams also driving the stalk entirely across the cutting edge, of the knife.

The second part of my invention consists in a rotating drum and coacting apron, having their axes in a substantially vertical plane, and so located as to engage the stalks before they are severed and to hold them during severance, and to carry the same, after severance, in a vertical position to the opposite side and rear, and within the grasp of the binding mechanism. The difficulty heretofore in this part has been in the matter of controlling the stalks after they were severed. The stalks, going on to the machine in various positions and loaded with attached ears of corn, if once permitted to fall, do so in such varied positions as to render it impracticable to thereafter handle the same conveniently. In my invention the grasp of the machine upon the stalks begins before the latter are severed, and continues until the stalks are delivered within the grasp of the binding mechanism, and are thus held, during all of their transit through the machine and during the process of binding, in a vertical position, and also are never released from the grasp of the machine until, after being bound, they are thrown from the machine in bundles.

A third improvement is a provision of gathering and packing arms, which rotate in a horizontal plane on the upper and lower ends of said drum, and carry the stalks to the knife, assist in holding the stalks while being severed, force the latter into the binding mechanism, and, during the interval of binding the bundle, pack the stalks in a chamber adjacent to the binding table.

A fourth improvement consists in an oscillating packer can, which graduates the scope of the action of the aforesaid gatherers and packers, so as to arrest the influence of the latter, during the process of binding, before reaching the binding table.

A fifth improvement consists in a horizontal rotating binding table, provided with low radial partitions, to receive the butts of the stalks, and on which, during the process of the accumulation of the bundle, the stalks are rotated in a vertical position, and thereby any misplaced or horizontal stalks are separated from the incoming stalks and wound into the bundle, so that the latter is compact and convenient for handling, and, being disconnected from the oncoming stalks, can be readily discharged.

I attain the purposes and advantages aforesaid by the mechanism illustrated in the accompanying drawings, in which—

Figure 2:
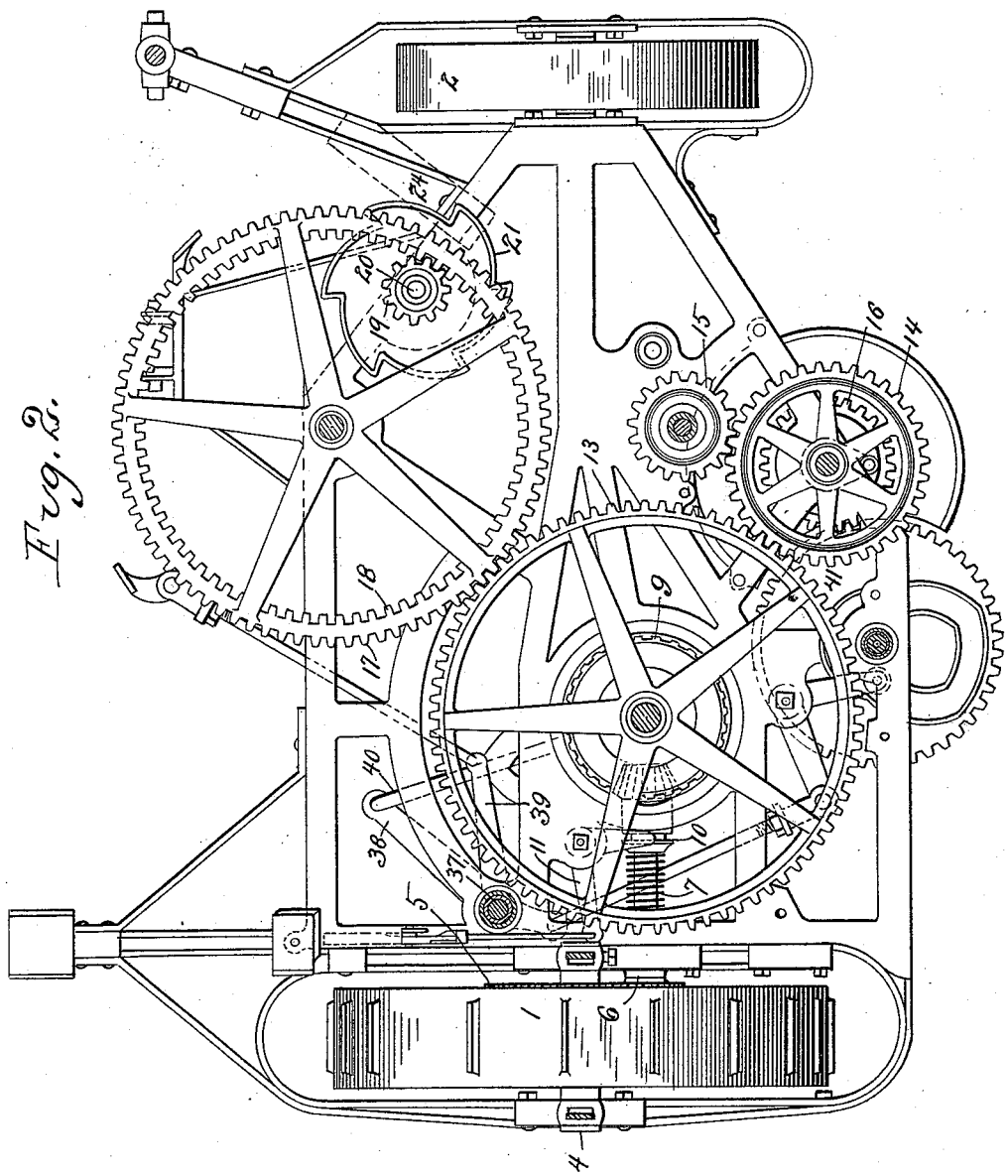
Figure 3:
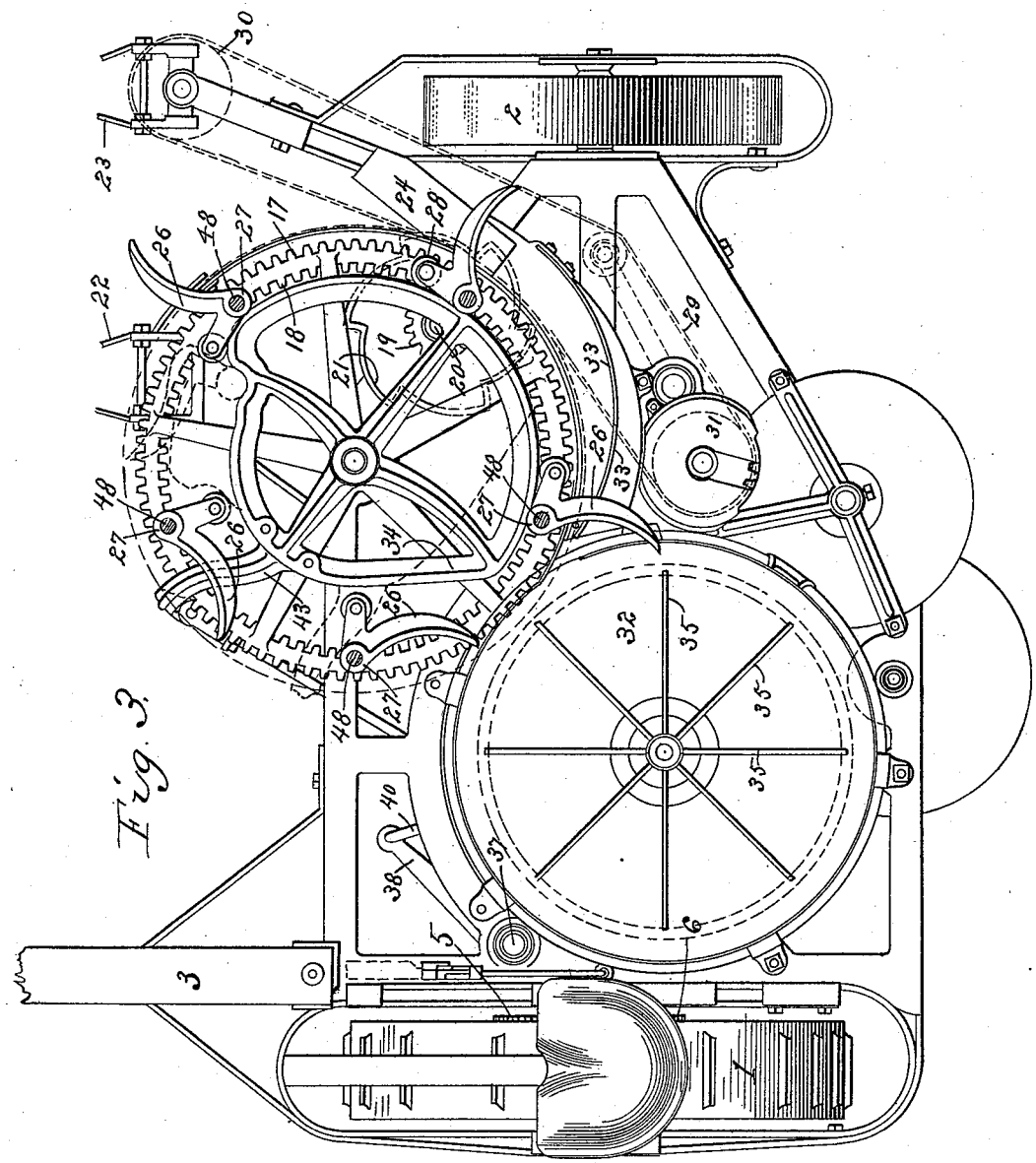
Figure 4:
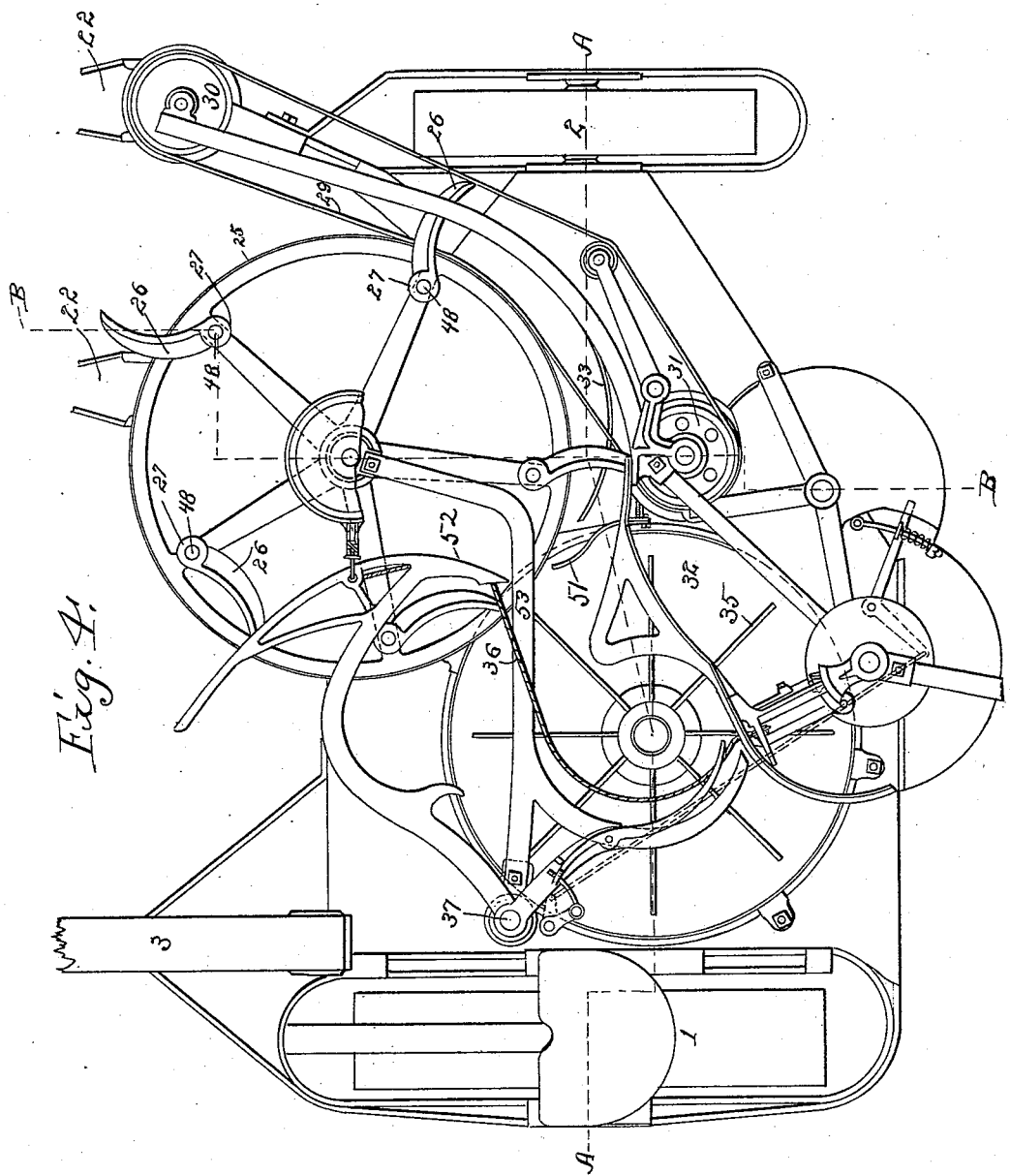
Figure 5:
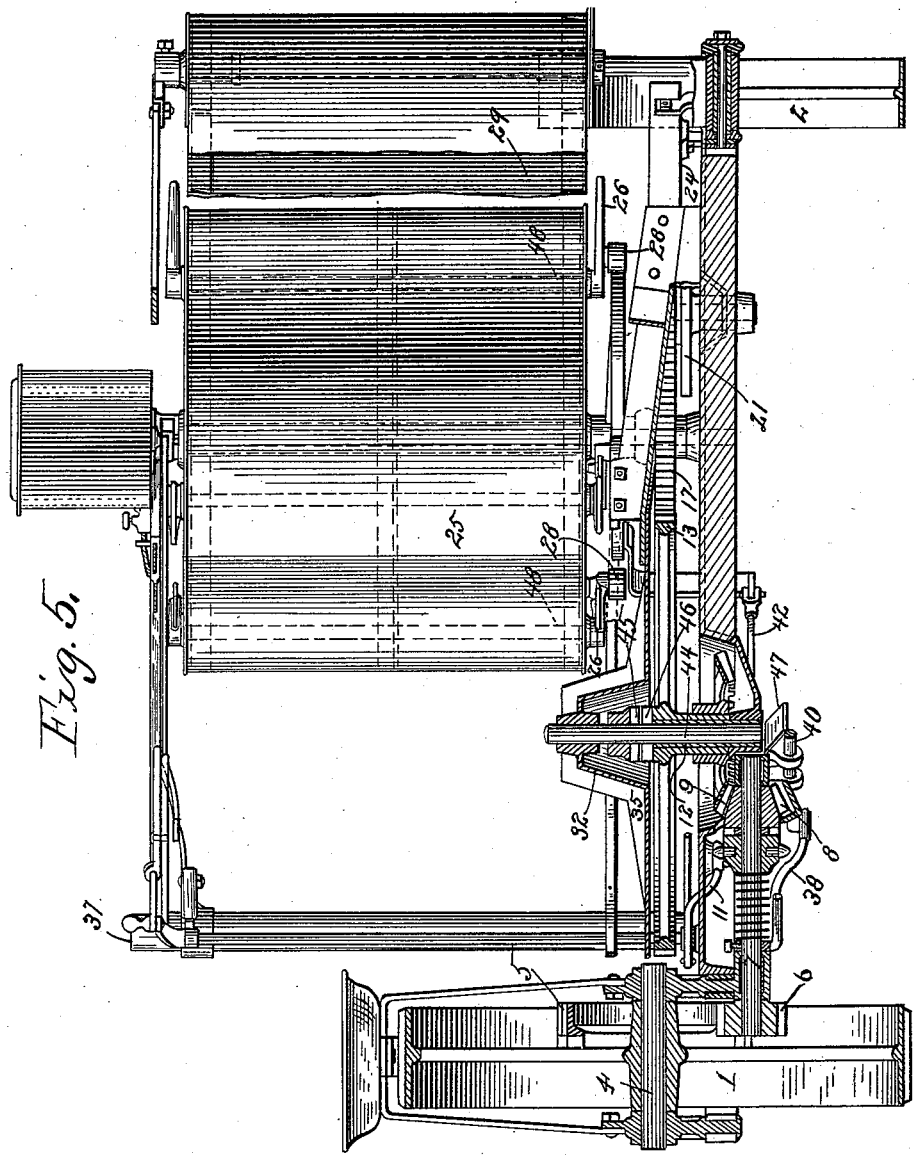
Figure 6:
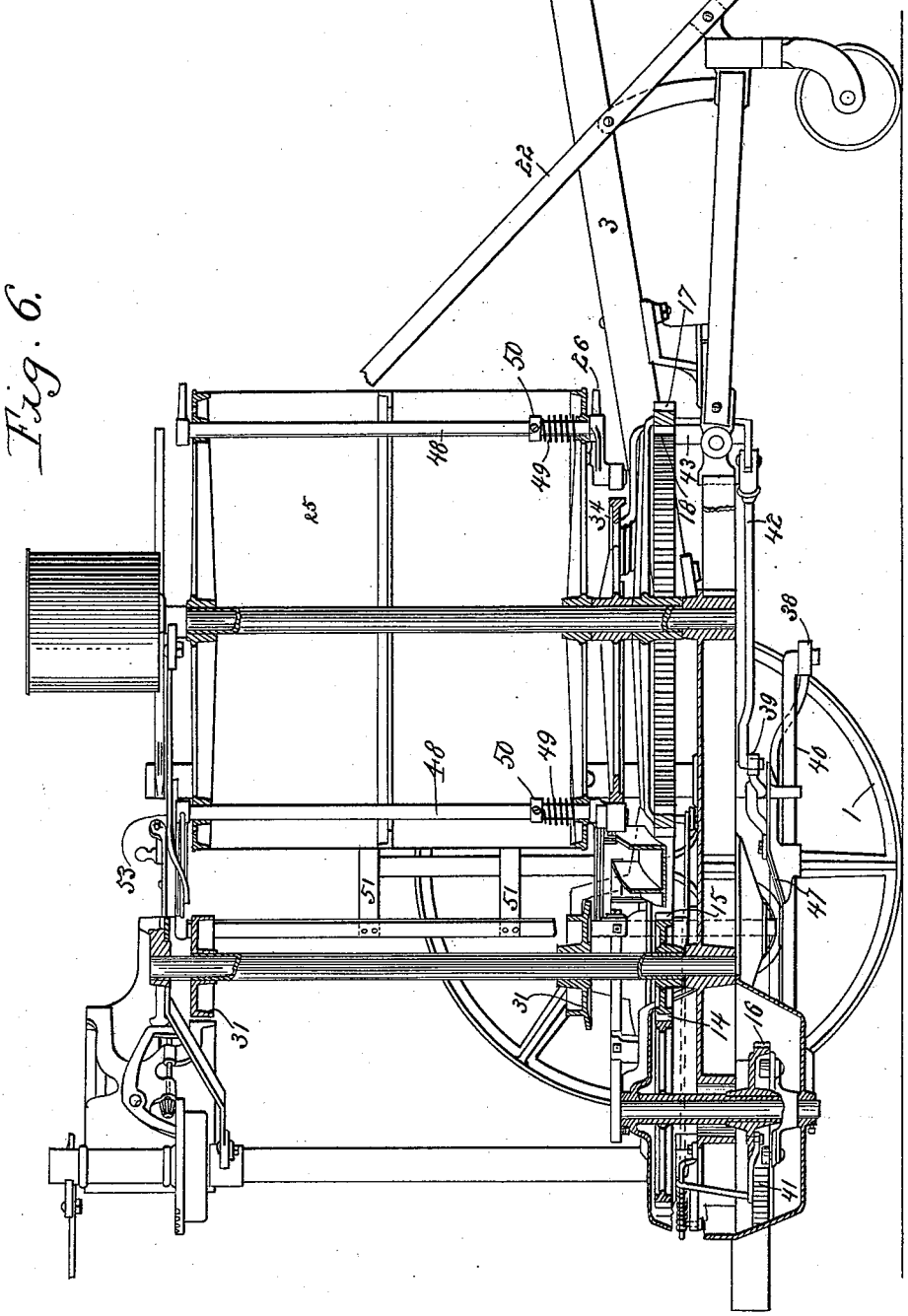

Figure 1 is a horizontal, sectional view of a machine embodying my invention, taken below the platform. Fig. 2 is the same, partly in section, just above the platform. Fig. 3 is the same, partly in section, the drum being omitted slightly above the line of Fig. 2, and about a foot above the platform. Fig. 4 is a top or plan view of the machine. Fig. 5 is a vertical cross-section in the line A—A of Fig. 4. Fig. 6 is a vertical, longitudinal section, in the line B—B of Fig. 4.

Similar figures refer to similar parts throughout the several views.

As the binding mechanism is substantially that heretofore in use for similar purposes, and nothing will be herein claimed thereon, I do not deem it necessary to specifically describe the same.

The machine is carried upon two wheels, one being the driving wheel 1, located at the left, and the other the carrying-wheel 2, located at the right side of the machine, viewed from the rear. The machine is drawn from the tongue 3, located in front and slightly to the right of the driving wheel 1. The driving wheel 1 rotates upon an axis 4, and carries a gear 5, which engages and rotates a pinion 6 rigidly seated upon its shaft 7, horizontally journaled transversely of the machine. The opposite or inner end of the shaft 7 is provided with a bevel pinion 8, adapted to engage and rotate a bevel gear 9, suitably seated near the center of the machine under the binding table. A clutch 10, feathered on the shaft 7 and controlled in the usual way by a bell-crank lever 11, optionally engages and disengages the pinion 8 for the purpose of throwing the machine into and out of gear, the lever 11 being controlled from the driver's seat.

The gear 9 is seated on a vertical sleeve 12, upon the upper end of which sleeve is seated a horizontal gear 13 (Fig. 5). The latter gear engages and rotates a horizontal gear-wheel 14, seated to the right and slightly to the rear of wheel 13 (Fig. 2), and wheel 14 engages the pinion 15, seated on the rear roller of the apron 29, and which actuates said apron. The gear wheels and pinions, thus far mentioned, run continuously when the machine is in gear.

Below the wheel 14, and seated on the axle thereof, is shown the time pinion 16 which operates the binding mechanism, but as no claim will be made herein to the binding mechanism, a further description of the latter wheel and its operation will be omitted.

In front and slightly to the right of wheel 13 (Fig. 2), is seated the horizontal gear-wheel 17, which carries the gathering drum 25, and is driven from wheel 13. The wheel 17 is provided also with an internal gear 18 which engages and actuates the pinion 19 seated on the shaft 20, which carries and rotates the stalk bender 21.

22 and 23 (Fig. 3) are arms projected forwardly and downwardly from the front of the machine on each side of the row of stalks to be cut, and adapted to carry said stalks into the interval between them. A horizontal knife 24 is seated to the rear of said interval, diagonally across the line of said row of stalks, and the stalk bending wheel 21 is so located that its cam edges will successively sweep under the knife 24, with a shear movement, at the rear portion of said knife. The peripheral velocity of the stalk bender 21 is about double that of the onward movement of the machine.

Journaled vertically in the drum 25 (Figs. 3 and 6), near the periphery of the latter, is an annular series of shafts 48, on the upper and lower ends of which are rigidly seated, at their inner ends 27, the gathering and packing arms 26. A torsional spring 49 is seated on each shaft 48, with its lower end projected into the lower end of drum 25, or journal of said shaft, and its other end inserted in a collar 50, adjustably seated on said shaft. The effect of spring 49 is to oscillate shaft 48 sufficiently to carry the free ends of arms 26 back within the periphery of drum 25, except when counteracted by the cam plate 34 (Fig. 3), hereinafter described. The two arms 26 on the same shaft oscillate coincidently. The arms 26 are carried on and with the drum 25, and have their movement toward and past the knife 24. The wheel 17 carries the drum 25, and the periphery of said drum is intended to have a movement about equal to that of the movement of the machine. The apron 29 (Fig. 3) is carried in a vertical position above the knife 24, on suitable end rollers 30 and 31, the roller 31 and said apron being driven by pinion 15 aforesaid (Fig. 2), said apron having the same velocity as said drum.

The gatherers 26 are segmental in form at their operative portion, and when in operation, project beyond the drum 25, and are held in operating position from the time they engage the vertical cornstalks before the latter reach the knife 24, and until they deliver the severed stalks on to the binding table 32, by a cam plate 34 seated loosely upon the shaft of the drum 25, the periphery of said cam bearing against the friction rollers 28 on the rear extension (Fig. 3) on the lower series of said gatherers, from their first engagement with the stalks, until the latter have been forced by said packers on to the binding table 32, and, during this transit, apron 29 and drum 25 assist in holding the stalks in a vertical position, and moving them toward said table. After the stalks have reached said table the friction rollers 28 pass beyond the influence of the cam 34, and the springs 49 fold the engaging ends of said gatherers back within the periphery of the drum 25, in which position they are carried around front until they reach the locality for re-engaging the uncut stalks, when the cam 34 throws and holds them successively outward into their position for use. The arms 26 first help to gather and transport the stalks, and finally force them upon the binding table 32.

A spring 33, seated edgewise in the interval between the apron 29 and drum 25, and curved toward the latter, holds the stalks against said drum, and in position for said gatherers to force the stalks on to the revolving binding table 32. The latter table is provided with low, radial partitions 35, which serve to prevent the butts of the stalks from slipping, and in connection with the binding string 36 (Fig. 4), hold the stalks in a vertical position. A vertical series of springs 51 (Figs. 4 and 6), usual binding needle 52 and transverse brace 53, prevent the oncoming stalks reaching table 32, during the binding.

In order to prevent the packing arms 26 from forcing the stalks on to the binding table, during the process of tying the bundles on the latter, the inward limit of the action of said arms is shifted, during said process of binding, toward the front of the machine, by the following mechanism:—The cam plate 34, which governs the action of said arms, is loosely seated on the axle of the drum 25 and wheel 17, below said drum. The vertical needle shaft 37 is seated in the frame of the machine to the right of the driving wheel 1, and provided with radial, horizontal arms 38 and 39. A pitman 40 is pivotally connected at its forward end to the extremity of arm 38, and at its rear end seated on a wrist pin formed on wheel 41, which is the time gear in the binding mechanism. A second pitman 42 connects the outer end of arm 39 with the arm 43, formed on the side of the cam plate 34 oppositely to the operating segment of the latter. The movement of the rock shaft 37 is so timed, by its connection to the time gear 41, relative to the process of binding, that, when the latter process begins, the pitman 40 is drawn toward the rear of the machine, which has the effect of throwing the arm 43 of the cam plate 34 toward the binding table, and the operative segment of said plate in the opposite direction, or toward the front of the machine, as shown in dotted lines in Fig. 3. This brings the rear end of the operating segment of said cam-plate sufficiently forward to allow the gathering arms 26 to fold in out of engagement with the stalks before the latter have reached the binding table. During the interval of binding, the stalks are, therefore, gathered into the space between the rear end of the apron 29 and the drum 25, into position to be carried upon the binding table, when the cam-plate 34 is again moved into its normal position shown in Fig. 3.

During the period of binding it is essential that the binding table 32 remain stationary, and its rotation is, therefore, intermitted by the following provision: In Fig. 5, 44 is a vertical pin, seated loosely in sleeve 12, and in the hub of wheel 13. The binding table 32 is splined or feathered upon the upper portion of said pin. On pin 44, and between the hub of wheel 13 and the attachment of said pin to table 32, there is keyed a clutch 45, adapted to optionally engage with a like clutch 46 formed on the upper edge of the hub of the wheel 13, and, when thus engaged, the rotation of wheel 13 is communicated to pin 44, and through said pin to binding table 32; but when the pin 44 is so raised as to disengage clutch 45 from clutch 46, the rotation of said pin will cease, and the binding table 32, being carried on the upper portion of said pin, will also cease to rotate. The pin 44 is raised, as aforesaid, during the time of binding, by means of an angular shoe 47, carried on the pitman 40, shown in Figs. 5 and 6, so that the same movement of pitman 40 which restricts the scope of the gathering arms 26, as aforesaid, also, by raising the pin 44, brings the binding table 32 to a stationary condition.

My invention is adapted to be used with any of the usual forms of binding mechanism, by certain modifications of the latter, care being taken that the action of pitman 40 be timed, as herein described.

The advantages of my invention are, that the stalks are grasped by the gathering arms 26 before severance, and continued in said grasp until delivered upon the binding table. Also, by the action of said arms, conjointly with that of the drum 25 and apron 29, the stalks are held in a vertical position, and such of the prostrate stalks as are too low to be engaged by the upper arms, are drawn into the bundles by the rotary action of the binding table 32. The surface movement of the said drum and apron is the same as that of the machine over the ground, so that while the stalks are held, as aforesaid, prior to and during the cutting operation, they are not dragged or drawn until after their severance, thus avoiding any excessive strain upon the team, or any disposition to pull the stalks out at the roots.

Another advantage, and a very important one, is the bending of the stalks toward the knife 24 by the edge of the cam-wheel 21, and the sweep of the latter across the edge of the knife.

Another advantage is that the stalks are retained in a vertical position on the binding table until the binding of the same into bundles is completed.

Another advantage consists in the fact that the binding table is located so near the rear and left side of the machine that the bundles, after being bound, are discharged from the rear of the machine, and so near the left side thereof as to be entirely out of the way of the passage of the team and machine at the next transit. A non-rotating binding table may be used in connection with said stalk carriers, but a rotating one is preferable.

What I claim as my invention, and desire to secure by Letters Patent of the United States, is—

1. In a corn harvester, the combination of a stationary knife and a horizontally rotating stalk bender arranged in a plane adjacent to the edge of the knife and adapted to bend the stalk toward the knife, whereby the entrance of the knife is upon the convex side of the stalk, substantially as described.

2. In a corn harvester, the combination of a diagonally placed fixed knife 24, and a revolving wheel 21 provided with a thick edge, adapted to pass obliquely under said knife, and to bend the stalks, during the process of cutting, toward said knife; substantially as shown, and for the purpose described.

3. In combination with the diagonally placed cutting knife 24, the rotating wheel 21, provided with eccentric sections on its periphery of a blunt formation, and adapted to sweep under said knife, and bend the stalks toward the latter during the process of cutting; substantially as shown, and for the purpose described.

4. In a corn harvester, the combination, with a vertical drum provided with projecting arms, of an apron traveling with its intermediate portion in engagement with the drum and its rear portion at a distance from the drum, whereby a pocket is formed, a binding platform at the rear of the pocket, and means for closing the pocket during the binding operation and for withdrawing the arms while they are passing the pocket during the time it is closed, substantially as set forth.

5. In a corn harvester, the combination of the rotating table 32, the vertical pin 44 provided with clutch 45, the wheel 13 provided with clutch 46, means for rotating said wheel, and the shoe 47 with means for actuating it; substantially as shown, and for the purpose described.

6. The combination of the vertical series of springs 51, binding needle 52 and transverse brace 53, whereby the entrance to the binding table is closed during the process of binding thereon, substantially as shown and for the purpose specified.

7. In a corn harvester, the combination, with a vertical drum provided with radially projecting arms, of an apron traveling with its intermediate portion in engagement with the drum and its rear portion away from the drum, a spring seated edgewise in the interval between the drum and the apron and curved toward the drum, a binding platform at the rear of the drum and the apron, a series of springs, a binding needle and a transverse brace for preventing the material passing to the table during the binding operation, and means for changing the projection of the arms from the drum while they are passing said springs, substantially as set forth.

In testimony whereof I affix my signature in presence of two witnesses.

GEORGE W. PACKER.

Witnesses:
 JOHN G. MANAHAN,
 HENRY C. WARD.